Patented Aug. 18, 1936

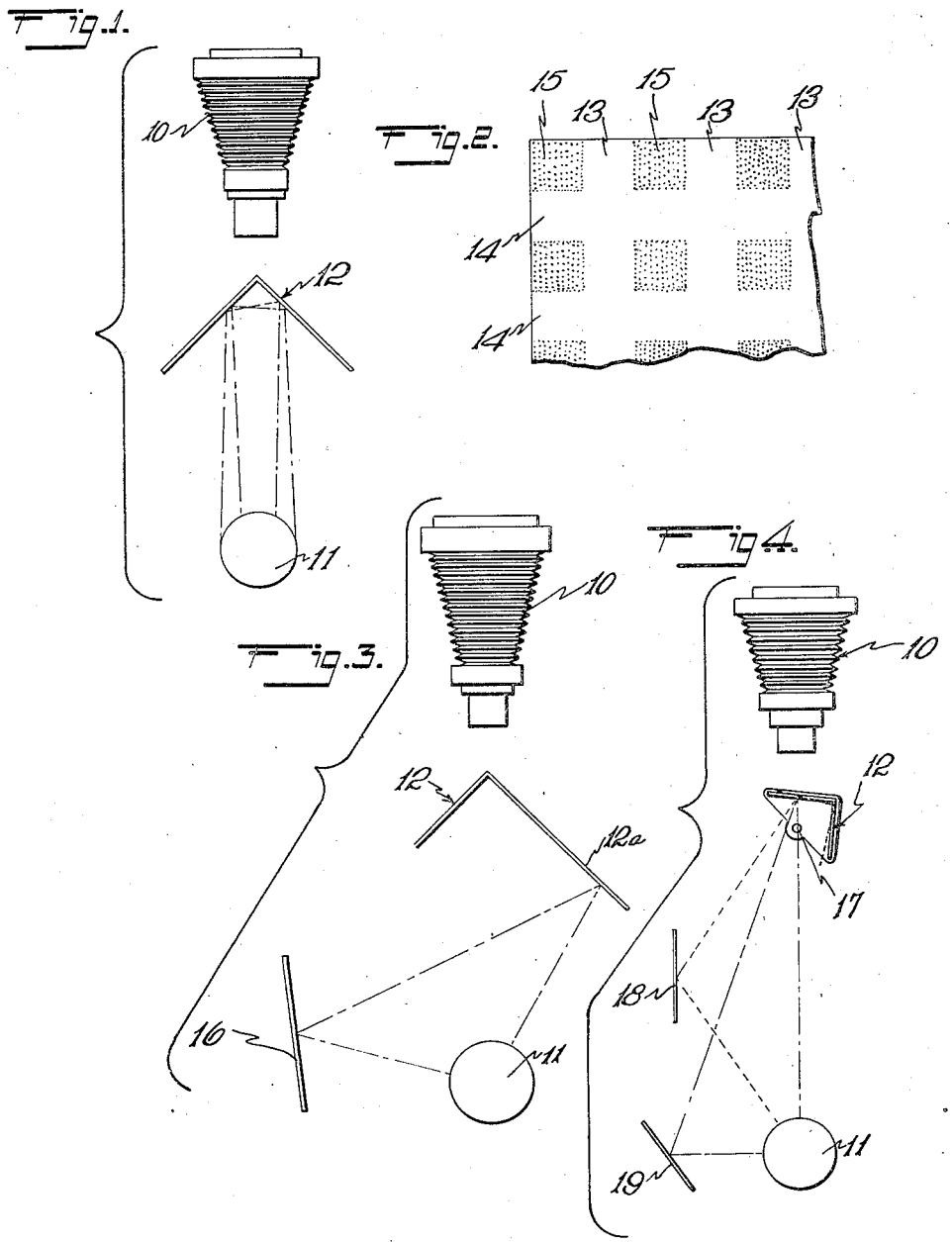

2,051,608

UNITED STATES PATENT OFFICE 2,051,608

PHOTOGRAPHIC APPARATUS

Otho V. Kean, Bronxville, N. Y., assignor to
Frederic P. Warfield, New York, N. Y.

Application March 30, 1934, Serial No. 718,157

16 Claims. (Cl. 88—74)

This invention relates to photographic apparatus and more specifically to pose-reflecting apparatus.

In general, it is an object of the invention to provide photographic apparatus which is simple and economical of construction, which can be expeditiously and conveniently manipulated, and which can be readily manufactured and assembled.

Another object of the invention is to provide a pose-reflecting photographic apparatus wherein the image seen by the poser is the same and as complete as that shown in the photograph, i. e., the left side of the reflected image is identical with the left side of the photograph; wherein the illumination is the same or approximately the same as for the usual apparatus; and wherein the actual photographic apparatus, comprising, for example, the lens system, is shut off from the poser as far as he can observe.

Another object is to provide a partially-reflecting pose mirror having relatively large transparent areas which is so disposed that the effect upon the photographically-sensitized element of any one of said areas is relatively small.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which:

Fig. 1 is a plan view of one form of apparatus embodying the invention;

Fig. 2 is a greatly-enlarged view of a small portion of the mirror shown in Fig. 1;

Fig. 3 is a plan view of a modification of the device shown in Fig. 1; and

Fig. 4 is a plan view of the device shown in Fig. 1 with parts rearranged.

In the exemplification shown in the drawing, 10 denotes diagrammatically means for taking a picture or photograph. This may be a conventional camera, which term is meant to include means for registering or recording images. The subject to be photographed may be placed at the point 11. Between the point 11 and the camera and in the path of the light rays from the subject to the camera is placed a means for reflecting part of the light from the subject back to the subject. This is shown as the mirror means 12. This mirror is partially transparent and comprises two sections which together form a right angle bisected by the line 11—10. As shown, each section faces the line 11—10, that is, a normal from the reflecting face crosses the line 11—10. The sections may be plane.

Each section is similar to the mirror described in my copending application Serial Number 693,746.

Preferably the mirror is formed from a partially-transparent mirror of the well-known type where the reflecting coating is so thin that it will pass forty or fifty per cent. of the light, as for instance from a sputtered mirror. Portions of the partially-reflecting coating are removed either mechanically or chemically at suitable points or lines, so as to provide a mirror which will pass a considerably larger percentage of the light, as for instance, seventy-five or eighty per cent. Desirably the mirror should reflect not more than thirty per cent. of the light for effective work under ordinary conditions. The removal of the coating may be accomplished by scraping the coating with a needle point or other tool, by the use of a fine tool to scratch through the shellac, which protects the silver without scratching the silver, and then dipping the mirror in a solution which removes the silver at those points or along those lines where the shellac has been removed and then immersing the mirror in a solution which stops the removing action; or by other suitable means. In such a manner there may be produced a mirror such as shown at 12, which gives a fine clear reflection, but which stops only a very small percentage of the light. As illustrated in Fig. 2, the mirror 12 may comprise perpendicular sets of parallel lines 13 and 14 from which the coating has been removed and which provide complete transmitting portions and intermediate portions 15 carrying a partially-reflecting and partially-transmitting, very thin coating. In practice, the lines 13 and 14 may be made sufficiently fine and sufficiently close together so that they are not obvious to the poser at point 11.

Because of the fact that the sections of the mirror are at an angle with the line 11—10 the effective area of each transparent portion of the mirror is reduced as far as the transmitting of light is concerned. It is therefore possible to use a mirror having larger transparent areas than if the mirror were perpendicular to the path of the light, without the design of transparent parts appearing in the picture. Accordingly the mirror used need not be as finely prepared, with attendant lessening in cost.

When the sections of the mirror are at right angles, the image of the poser is reflected from one section to the other and then back to the poser in rectified condition. The right-hand side of the poser appears as shown on the right-hand side of the image in the same way that it does in the final photograph. If a poser has some identifying feature on the right side, he can see exactly how it will look in the photograph. This is of considerable convenience both to the poser and to the operator, as the former is much less apt to reject photographs when an exact copy, side for side, of the final photograph has been seen prior to exposure. The sections of the mirror may be easily joined together so exactly that they appear to the poser to be one plane mirror. If desired, a reducing lens or flat plate glass may be placed between the mirror 12 and the poser.

With a rectifying, partially-transparent mirror as described, the lights of the room do not need to be shaded to cut off light from falling directly on the mirror, except that as in all cases strong light should not pass directly through the lens system from a source of light onto the sensitized film.

Pictures may be taken with the above-described apparatus with substantially the same illumination as would be used if the mirror means were not present.

It may be difficult to arrange a mirror at one side, intermediate the poser and the mirror 12, so that the poser presenting a profile or semi-profile to the camera may see in the side mirror his profile reflected from mirror 12, as either section of mirror 12 is apt to be in the path from the other section to the side mirror. This can be accomplished, however, by extending one of the sections farther away than the other from the apex of the dihedral angle formed by the sections as at 12a and by placing a mirror 16 in front of the mirror 12 and on the opposite side of the poser-camera line. Such an arrangement is shown in Fig. 3, wherein, for purposes of clarity and in order to show the angles clearly, the relative size and location of the camera, mirror and the object are conventionalized rather than shown in exact proportions. The portion 12a may be removable or be pivoted to swing back out of the way and/or there may be a similar extended portion on the other section of the mirror 12.

If it is desired, the mirror 12 may be rotatable about an axis such as an axis 17 parallel to the apex of and in a plane bi-secting the dihedral angle. Mirrors may be placed at various positions in front of the mirror 12 and on either side, for example, mirrors 18 and 19 shown in Fig. 4. With mirror 12 in the position shown in full lines, the image is reflected to mirror 19 from one section of mirror 12. With the mirror in the position shown in dotted line, the image is reflected from the other section of 12 to mirror 18 and thence to the poser. In all cases the picture is taken through some part of mirror 12. The image seen by the poser in all cases, whether profile or full face, corresponds with that found in the final picture, the left side with the left side and the right side with the right side.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In a device of the character described, the combination comprising means adapted for taking a picture and partially-reflecting mirror means permanently positioned in the path of the light which is to give rise to the picture, said mirror means being adapted to reflect light in a rectified condition and having certain transparent portions no one of which is large enough to transmit more than a fraction of the light necessary to take a picture.

2. In a device of the character described, the combination comprising means adapted for taking a picture and partially-reflecting mirror means permanently positioned in the path of the light which is to give rise to the picture, said mirror means being adapted to reflect light in a rectified condition and having certain transparent portions, no one of which is large enough to transmit more than a fraction of the light necessary to take a picture, each of said portions being separated from each other at least in part by other portions, which other portions are adapted for reflecting more light than said transparent portions reflect.

3. In a device of the character described, the combination comprising means adapted for taking a picture and partially-reflecting mirror means permanently positioned in the path of the light which is to give rise to the picture, said mirror means being adapted to reflect light in a rectified condition and having a plurality of portions which are more transparent than other portions, the total area and arrangement of said plurality being such that they are not obvious to a poser placed in a position to have a picture taken.

4. In a device of the character described, the combination comprising means adapted for taking a picture and partially-reflecting mirror means permanently positioned in the path of the light which is to give rise to the picture, said mirror means being adapted to reflect light away from said picture taking means and in a rectified condition and said mirror means being transparent at a plurality of points and being partially transparent at other points.

5. In a device of the character described, the combination comprising means adapted for taking a picture, and a plurality of partially-reflecting mirror means positioned in, and at the same numerical angle with, the path of the light which is to give rise to the picture and having certain transparent portions, the effective area of which is diminished because of the angular position.

6. In a device of the character described, the combination comprising means adapted for taking a picture, and a plurality of partially-reflecting mirror means correlated to reflect light in a rectified condition, positioned at various angles in the path of the light which is to give rise to the picture and having certain transparent portions, the effective area of which is diminished because of the angular position.

7. In a device of the character described, the combination comprising means adapted for taking a picture and a plurality of partially-reflecting mirror means positioned at various angles in the path of the light which is to give rise to the picture, and passing said path from opposite sides of said path, and having certain transparent portions, the effective area of which is diminished because of the angular position, said portions having the shape of relatively fine lines.

8. In a device of the character described, the combination comprising means adapted for taking a picture and a plurality of partially-reflecting mirror means positioned at various angles in the path of the light which is to give rise to the picture, and having certain transparent portions, the effective area of which is diminished because of the angular position, said angles being such that the reflected light is rectified.

9. In a device of the character described, the combination comprising means adapted for taking a picture and two partially-reflecting mirror means positioned at right angles to each other and with said right angle bisected by a plane parallel to the path of the light which is to give rise to the picture, said mirror means being positioned between the camera and the subject of the picture.

10. In a device of the character described, the combination comprising means adapted for taking a picture, rotatable means positioned in the path of light from an object and arranged to reflect in a rectified condition a small portion of the light received and to transmit a large portion of the light received, and reflecting means in front and to the side of said picture-taking means and adapted for certain positions of said first-mentioned reflecting means to reflect to a poser the image received by said picture-taking means through said first-mentioned reflecting means.

11. In a device of the character described, the combination comprising means adapted for taking a picture, two partially-reflecting mirror means positioned at right angles to each other and with said right angle bisected by a plane parallel to the path of the light which is to give rise to the picture and revoluble about a predetermined point, and reflecting means in front of and to the side of said picture-taking means and adapted for certain positions of said first-mentioned reflecting means to reflect to a poser the light which may be formed into an image similar to the image received by said picture-taking means through one of said two mirror means.

12. In a device of the character described, the combination comprising means adapted for taking a picture, two, plane, partially-reflecting mirror means positioned at right angles to each other and with said right angle bisected by a plane parallel to the path of the light which is to give rise to the picture, one of said mirror means extending farther from the apex of the dihedral angle than the other, and reflecting means in front of and to the side of said picture-taking means and adapted to reflect to a poser light which may be formed into substantially the same image as that received by said picture-taking means and arising from light which has passed through said two mirror means.

13. In a device of the character described, the combination comprising means adapted for taking a picture, and positive-mirror means in the field of view of said picture-taking means, and adapted for transmitting a large portion of the light received to said picture-taking means, and having a predetermined amount of a reflecting metallic substance associated therewith, whereby the reflected light is but a small portion of the incident light.

14. In a device of the character described, the combination comprising means adapted for taking a picture, and a plurality of partially-reflecting mirror means correlated to reflect light in a rectified condition, positioned at various angles in the path of the light which is to give rise to the picture and having certain transparent portions, the effective area of which is diminished because of the angular position, and having certain other portions which latter are provided with a reflecting metallic substance.

15. In a device of the character described, the combination comprising means adapted for taking a picture, and a plurality of partially-reflecting mirror means positioned in, and at various angles with, the path of the light which is to give rise to the picture and having certain transparent portions, the effective area of which is diminished because of the angular position, said angles being such that at least a part of the light coming from the object, the picture of which is to be taken, and reflected from one of said mirror means, is reflected from another of said mirror means.

16. In a device of the character described, the combination comprising means adapted for taking a picture, and a plurality of partially-reflecting mirror means positioned in, and at various angles with, the path of the light which is to give rise to the picture and having certain transparent portions, the effective area of which is diminished because of the angular position, said angles being such that the reflected light is reflected away from said picture-taking means.

OTHO V. KEAN.